W. E. TAFT.
VALVE FOR INTERNAL COMBUSTION ENGINES.
APPLICATION FILED APR. 8, 1912.

1,115,986.

Patented Nov. 3, 1914.

Witnesses
Walter F. Ludy
Socrates Scholfield

Inventor
Walter E. Taft

UNITED STATES PATENT OFFICE.

WALTER E. TAFT, OF PROVIDENCE, RHODE ISLAND.

VALVE FOR INTERNAL-COMBUSTION ENGINES.

1,115,986.  Specification of Letters Patent.  Patented Nov. 3, 1914.

Application filed April 3, 1912. Serial No. 689,183.

*To all whom it may concern:*

Be it known that I, WALTER E. TAFT, citizen of the United States, residing at Providence, in the county of Providence and State of Rhode Island, have invented certain new and useful Improvements in Valves for Internal-Combustion Engines, of which the following is a specification.

The object of my invention is to provide a valve that is guarded against the great pressure due to the explosion of the gas in the cylinder of the engine, to eliminate carbonization, and provide means for lessening the friction of the movement of the valve.

Figure 1:
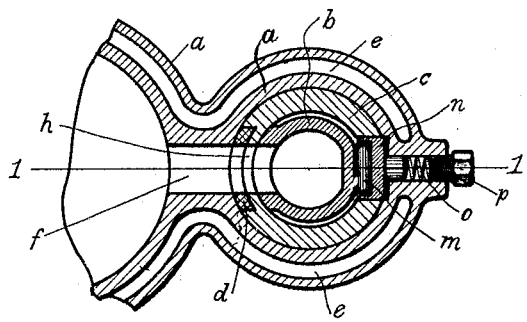
Figure 3:
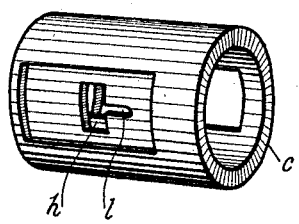
Figure 4:
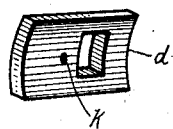
Figure 8:
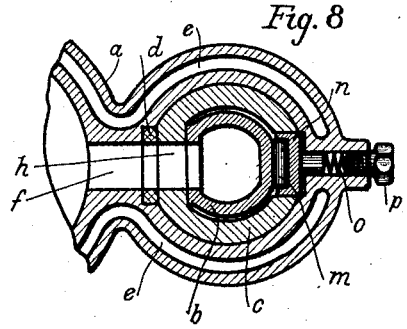
Figure 6:
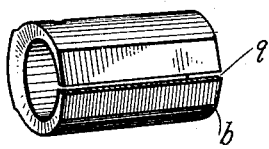
Figure 5:
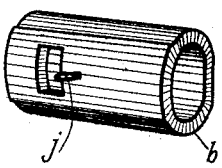
Figure 7:
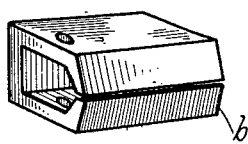
Figure 2:
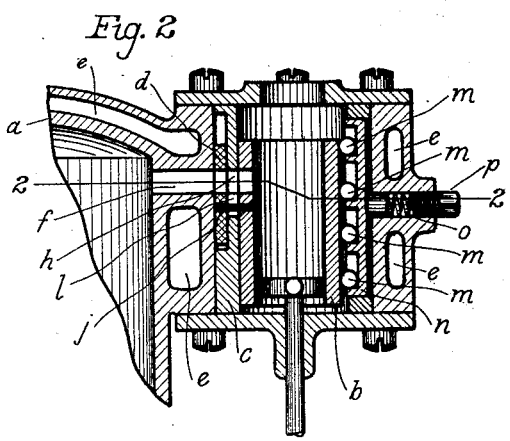

In the accompanying drawing: Figure 1 is a transverse section of the valve and the valve chamber taken on the line 2. 2. of Fig. 2. Fig. 2 is a longitudinal section of the same taken on the line 1. 1. of Fig. 1. Fig. 3 is a perspective view of the lining for the valve chamber showing the seat for the supplementary valve. Fig. 4 is a perspective view of the supplementary valve. Fig. 5 is a perspective view of the inner valve. Fig. 6 is a perspective view showing a modification of the inner valve. Fig. 7 is a perspective view showing another modification of the inner valve. Fig. 8 is a transverse section showing a flat valve seat.

In the drawing, $a$ represents the valve casing; $b$ the reciprocating inner valve; $c$ the lining of the valve casing, and $d$ the supplementary valve. The valve casing $a$ is provided with the water passage $e$ for cooling the said casing, and with the port $f$, which may constitute either an inlet or an exhaust port as the case may be, and the lining $c$ of the valve casing is also provided with a port $h$, held in register with said port $f$. Between the said casing $a$, and the lining $c$, is placed the supplementary valve $d$, which is connected for simultaneous movement with the valve $b$, by means of the pin $j$, which enters the hole $k$, made in the supplementary valve, the said pin crossing from one of said valves to the other, through slot $l$, of the lining $c$.

The valve $b$ as shown in Fig. 1, is made tubular, with one side flattened for the action of the anti-friction rolls $m$, thereon, the anti-friction rollers $m$, $m$, being backed by means of a shoe $n$, which is resiliently held in its bearing position against the said rollers by means of the spring $o$, and the adjusting screw $p$. The supplementary valve $d$ serves to protect the spring-actuated inner valve $b$ from the effect of the excessive pressure of the explosion when the valve is closed.

A modification of my invention is shown in Fig. 6 in which the valve $b$ is made tubular, with the axis of the bore located at one side of the axis of the periphery, and having a longitudinal slot $q$ made in the thinner side of the said tube, whereby the said valve may be caused to yield resiliently to its original cylindrical form when it has been outwardly or inwardly deflected therefrom.

A further modification of my invention is shown in Fig. 8, and in this case the lining is made flat for the seats and the valve $b$ is flat on the side that seats upon the flat valve seat. The supplementary valve also is made flat.

I do not limit myself to the construction specified, as the object of the invention may be accomplished in various ways.

This invention is specific with respect to the broad invention explained in my case Serial No. 687,176, filed March 29, 1912. It differs from the specific invention therein used to illustrate such broad invention in this, among other things, that the inner valve is movable lengthwise after the manner of a slide valve, instead of having a rotary reciprocating or oscillating motion; and also in this, that the antifriction rollers are applied transversely instead of lengthwise of the valve.

I claim as my invention—

1. A valve casing provided with a port for the passage of the motive fluid, a lining for the said casing, also provided with a port registering with the said port in the casing, a cylindrical valve within the said lining, a supplementary valve located at the outer side of the said lining and having its seat thereon and operatively connected with the said inner valve for simultaneous movement therewith, and operative means for imparting a reciprocating sliding movement to the said valves.

2. A valve, having a casing, a lining therein, and a tubular slide valve arranged in said casing, said casing, lining and valve having coöperating ports, and a series of antifriction rollers arranged transversely of the valve on its side opposite the ports, and a pressure device for holding said rollers in forcible contact with the valve.

3. A valve casing having a port therein, a valve chamber, a valve seat therein, a lining covering said valve seat having a port registering with the said port in the valve casing, a valve seating within and upon said lining, a supplementary valve located at the outer side of the said lining and having its seat thereon and operatively connected with the inner valve for simultaneous movement therewith, and operative means for imparting a reciprocating sliding movement to said valves.

In testimony whereof, I affix my signature in the presence of two witnesses.

WALTER E. TAFT.

Witnesses:
 CHAS W. EDDY,
 W. S. MARSH.

Copies of this patent may be obtained for five cents each, by addressing the "Commissioner of Patents, Washington, D. C."